United States Patent
Demuth et al.

(10) Patent No.: US 7,853,651 B2
(45) Date of Patent: Dec. 14, 2010

(54) METHOD FOR TRACKING TRANSPORT REQUESTS AND COMPUTER SYSTEM WITH TRACKABLE TRANSPORT REQUESTS

(75) Inventors: Michael Demuth, Rauenberg (DE); Volker Schulz, Heppenheim (DE); Herbert Stegmuller, Bruchsal (DE)

(73) Assignee: SAP AG, Walldorf (DE)

( * ) Notice: Subject to any disclaimer, the term of this patent is extended or adjusted under 35 U.S.C. 154(b) by 1209 days.

(21) Appl. No.: 11/262,442

(22) Filed: Oct. 27, 2005

(65) Prior Publication Data
US 2006/0112189 A1 May 25, 2006

(30) Foreign Application Priority Data
Oct. 27, 2004 (EP) .................................. 04025504

(51) Int. Cl.
*G06F 15/16* (2006.01)
(52) U.S. Cl. .................... 709/205; 717/168; 717/120
(58) Field of Classification Search ......... 709/202–227; 725/32; 705/1; 370/412; 340/870.02
See application file for complete search history.

(56) References Cited

U.S. PATENT DOCUMENTS

| | | | |
|---|---|---|---|
| 5,237,688 A | 8/1993 | Calvert et al. | |
| 5,495,610 A | 2/1996 | Shing et al. | |
| 5,608,721 A | 3/1997 | Natarajan et al. | |
| 5,745,767 A | 4/1998 | Rosen et al. | |
| 5,845,090 A | 12/1998 | Collins, III et al. | |
| 5,859,977 A | 1/1999 | Nishiyama et al. | |
| 5,860,007 A | 1/1999 | Soni et al. | |
| 5,953,533 A | 9/1999 | Fink et al. | |
| 6,110,228 A | 8/2000 | Albright et al. | |
| 6,263,358 B1 | 7/2001 | Lee et al. | |
| 6,308,173 B1 | 10/2001 | Glasser et al. | |
| 6,513,132 B1 | 1/2003 | Suzuki | |
| 7,020,690 B1 * | 3/2006 | Haitsuka et al. | ............. 709/217 |
| 7,107,331 B2 | 9/2006 | Gava et al. | |
| 7,721,257 B2 | 5/2010 | Demuth et al. | |

(Continued)

FOREIGN PATENT DOCUMENTS

JP 2001265603 9/2001

(Continued)

OTHER PUBLICATIONS

"U.S. Appl. No. 11/261,816, Final Office Action mailed May 14, 2009", 12 pgs.

(Continued)

*Primary Examiner*—Bunjob Jaroenchonwanit
(74) *Attorney, Agent, or Firm*—Schwegman, Lundberg & Woessner, P.A.

(57) ABSTRACT

A method for tracking transport requests in a system landscape comprising a central control system and a plurality of logical systems interconnected by logical transport paths, a transport request defining a software service for a system in the landscape, is described. The method includes feeding a transport request into a logical system of the plurality of logical systems; providing a data supplier in the logical system for supplying, to the central system, data supplier information containing information about the transport request; providing a data collector in the central system for obtaining the data supplier information and accordingly updating status data; and providing a tracking service in the central system, the tracking service allowing to analyze the status data.

16 Claims, 4 Drawing Sheets

U.S. PATENT DOCUMENTS

| | | | |
|---|---|---|---|
| 7,725,891 B2 | 5/2010 | Demuth et al. | |
| 2001/0052074 A1 | 12/2001 | Pensak et al. | |
| 2002/0026592 A1 | 2/2002 | Gavrila et al. | |
| 2002/0103851 A1* | 8/2002 | Kikinis | 709/202 |
| 2002/0129356 A1 | 9/2002 | Hellerstein et al. | |
| 2002/0156798 A1 | 10/2002 | Larue et al. | |
| 2002/0169878 A1 | 11/2002 | Orenshteyn | |
| 2002/0174164 A1 | 11/2002 | Hayashi | |
| 2002/0184398 A1 | 12/2002 | Orenshteyn | |
| 2002/0198725 A1* | 12/2002 | Piepenbrink et al. | 705/1 |
| 2003/0040974 A1 | 2/2003 | Chauvin et al. | |
| 2003/0084350 A1 | 5/2003 | Eibach et al. | |
| 2003/0093516 A1* | 5/2003 | Parsons et al. | 709/224 |
| 2003/0142627 A1 | 7/2003 | Chiu et al. | |
| 2004/0010708 A1 | 1/2004 | Johnson et al. | |
| 2004/0060044 A1 | 3/2004 | Das et al. | |
| 2004/0073720 A1* | 4/2004 | Clough et al. | 710/15 |
| 2004/0081183 A1* | 4/2004 | Monza et al. | 370/412 |
| 2004/0117795 A1 | 6/2004 | Wang et al. | |
| 2004/0143811 A1 | 7/2004 | Kaelicke et al. | |
| 2004/0267935 A1* | 12/2004 | Patiejunas | 709/227 |
| 2005/0080888 A1* | 4/2005 | Walter | 709/223 |
| 2005/0209732 A1* | 9/2005 | Audimoolam et al. | 700/216 |
| 2005/0210501 A1* | 9/2005 | Zigmond et al. | 725/32 |
| 2006/0026278 A1* | 2/2006 | Yu | 709/224 |
| 2006/0117311 A1 | 6/2006 | Demuth et al. | |
| 2006/0123392 A1 | 6/2006 | Demuth et al. | |
| 2006/0123407 A1 | 6/2006 | Demuth et al. | |
| 2006/0143614 A1 | 6/2006 | Lier et al. | |
| 2006/0149813 A1* | 7/2006 | Janik | 709/203 |
| 2006/0155832 A1 | 7/2006 | Demuth et al. | |
| 2006/0164257 A1* | 7/2006 | Giubbini | 340/870.02 |
| 2006/0203812 A1 | 9/2006 | Demuth et al. | |
| 2007/0038610 A1* | 2/2007 | Omoigui | 707/3 |
| 2007/0233854 A1* | 10/2007 | Bukovec et al. | 709/224 |
| 2008/0183840 A1* | 7/2008 | Khedouri et al. | 709/217 |
| 2010/0058287 A1* | 3/2010 | Sundararajan et al. | 717/104 |

FOREIGN PATENT DOCUMENTS

| | | |
|---|---|---|
| WO | WO-2006003482 A2 | 8/2001 |
| WO | WO-03060718 A1 | 7/2003 |

OTHER PUBLICATIONS

"U.S. Appl. No. 11/261,816, Non-Final Office Action mailed Dec. 30, 2008", 14 pgs.

"U.S. Appl. No. 11/261,816, Response filed Mar. 18, 2009 to Non-Final Office Action mailed Dec. 30, 2008", 15 pgs.

"U.S. Appl. No. 11/262,343, Final Office Action mailed Apr. 27, 2009", 11 pgs.

"U.S. Appl. No. 11/262,343, Non-Final Office Action mailed Nov. 28, 2008", 16 pgs.

"U.S. Appl. No. 11/262,343, Response filed Jan. 30, 2009 to Non-Final Office Action mailed Nov. 28, 2008", 13 pgs.

"U.S. Appl. No. 11/262,543, Final Office Action mailed Apr. 27, 2009", 13 Pgs.

"U.S. Appl. No. 11/262,543, Non-Final Office Action mailed Dec. 30, 2008", 11 pgs.

"U.S. Appl. No. 11/262,543, Response filed Mar. 9, 2009 to Non-Final Office Action mailed Dec. 30, 2008", 14 pgs.

IBM Corporation, "", *Tivoli software distribution users guide 4.1*, (636 pages) XP-002321301.

IBM Corporation, "", *IBM Tivoli Configuration Manager—User's Guide for Software Distribution—Version 4.2*, XP-2325607, (Oct. 2002), 1-358.

McFarland Metzger, Sue S, "SAP R/3 change and transport management : the official SAP guide / (SAP R/3—Systemlandschaft Implementieren und warten)", XP-002325774, (Jan. 12, 2000), 419, 461, 465.

Schneider-Neureither, Andreas (ED), "SAP System Landscape Optimization", *SAP Press*, 2004, ISBN 1-59229-026-4, (2004), 73-78; 96-100.

"U.S. Appl. No. 11/261,816, Advisory Action mailed Jul. 28, 2009", 3 pgs.

"U.S. Appl. No. 11/261,816, Notice of Allowance mailed Sep. 28, 2009", 11 Pgs.

"U.S. Appl. No. 11/261,816, Response filed Aug. 11, 2009 to Advisory Action mailed Jul. 28, 2009", 11 pgs.

"U.S. Appl. No. 11/261,816, Response filed Jul. 10, 2009 to Final Office Action mailed May 14, 2009", 12 pgs.

"U.S. Appl. No. 11/262,043, Non-Final Office Action mailed Oct. 27, 2009", 11 Pgs.

"U.S. Appl. No. 11/262,143, Non-Final Office Action mailed Oct. 8, 2009", 10 pgs.

"U.S. Appl. No. 11/262,143, Response filed Dec. 11, 2009 to Non Final Office Action mailed Oct. 8, 2009", 14 pgs.

"U.S. Appl. No. 11/262,343, Advisory Action mailed Jun. 30, 2009", 5 pgs.

"U.S. Appl. No. 11/262,343, Non-Final Office Action mailed Sep. 14, 2009", 16 Pgs.

"U.S. Appl. No. 11/262,343, Response filed Jun. 15, 2009 to Final Office Action mailed Apr. 27, 2009", 12 pgs.

"U.S. Appl. No. 11/262,343, Response filed Dec. 4, 2009 to Non Final Office Action mailed Sep. 14, 2009", 12 pgs.

"U.S. Appl. No. 11/262,543, Advisory Action mailed Jul. 1, 2009", 3 pgs.

"U.S. Appl. No. 11/262,543, Notice of Allowance mailed Sep. 15, 2009", 10 Pgs.

"U.S. Appl. No. 11/262,543, Pre-Appeal Brief Request mailed Jul. 20, 2009", 5 pgs.

"U.S. Appl. No. 11/262,543, Response filed Jun. 15, 2009 to Final Office Action mailed Apr. 27, 2009", 11 pgs.

"U.S. Appl. No. 11/261,816 Notice of Allowance mailed Jan. 12, 2010", 5 pgs.

"U.S. Appl. No. 11/262,043, Response filed Jan. 21, 2010 to Non Final Office Action mailed Oct. 27, 2009", 10 pgs.

"U.S. Appl. No. 11/262,143, Final Office Action mailed Mar. 25, 2010", 14 pgs.

"U.S. Appl. No. 11/262,143, Pre-Appeal Brief Request filed May 11, 2010", 5 pgs.

"U.S. Appl. No. 11/262,326, Non-Final Office Action mailed Apr. 26, 2010", 13,pgs.

"U.S. Appl. No. 11/262,343, Examiner Interview Summary mailed Nov. 9, 2009", 3 pgs.

"U.S. Appl. No, 11/262,343, Final Office Action mailed Mar. 9, 2010", 16 pgs.

"U.S. Appl. No. 11/262,343, Pre-Appeal Brief Request filed Apr. 15, 2010", 5 pgs.

"U.S. Appl. No. 11/262,543, Notice of Allowance mailed Jan. 7, 2010", 5 pgs.

Bawtree, Hugh, "A tool for managing change; Software Development", XP-002321302, (Aug. 2000),18 pgs.

Hodgson, Alan, "Intel eBusiness Engineering Release Management and Application Landing", XP-002321303 Intel Technology Journal, Q4, (2000),1-9.

IBM Document Center, "Publication information", XP-2325608, (Observed Apr. 21, 2005),1 pg.

Szallies, Constantin, "On Using the Observer Design Pattern", XP-002323533, (Aug. 21, 1997),9 pgs.

\* cited by examiner

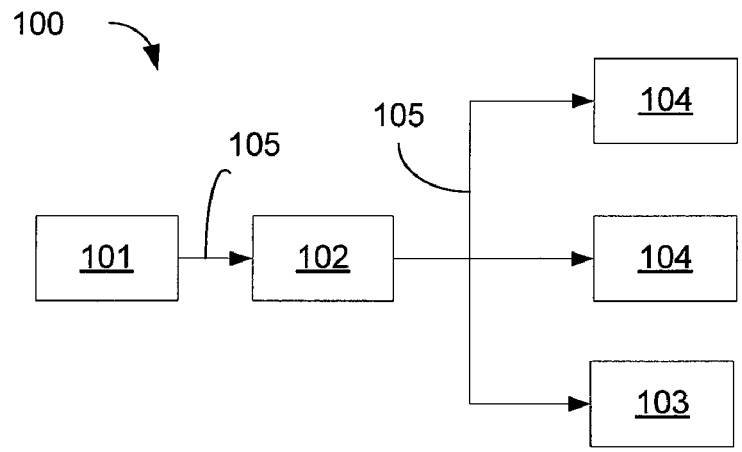
-- PRIOR ART --
Figure 1
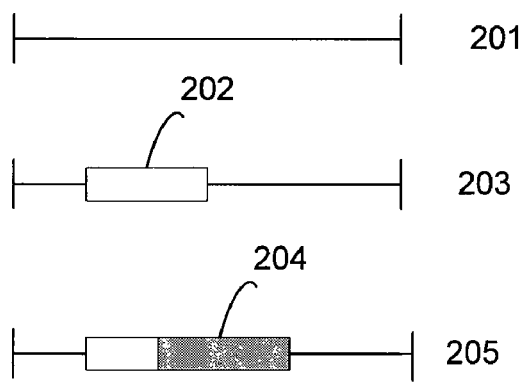 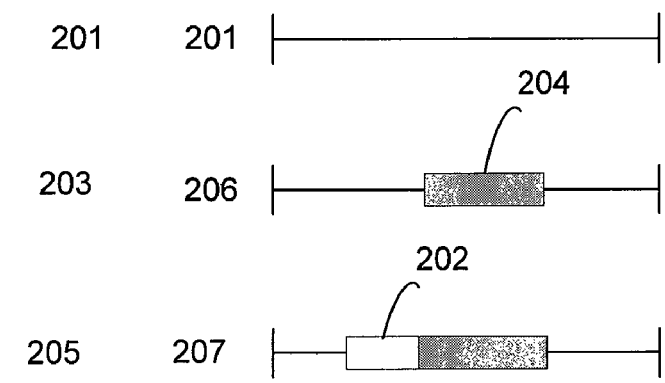
Figure 2a                     Figure 2b
-- PRIOR ART --

METHOD FOR TRACKING TRANSPORT REQUESTS AND COMPUTER SYSTEM WITH TRACKABLE TRANSPORT REQUESTS

CLAIM OF PRIORITY

The present patent application claims the priority benefit of the filing date of European Application (EPO) No. 04 025 504.4 filed Oct. 27, 2004, which is incorporated herein by reference.

TECHNICAL FIELD

This application relates generally to servicing of a software system landscape by means of transport requests, and more particularly to a method for tracking transport requests and a computer system with a software system landscape and trackable transport requests.

BACKGROUND

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and R6 hrs, Galileo Press GmbH, Bonn, Germany, $4^{th}$ reprint 2004, ISBN 3-934358-42-X.

Before such servicing may be performed, however, it has to be assured that the customizations, adaptations, program and data updates etc. are free of errors and integrate flawlessly into the software and data environment. In a factory for instance servicing errors are bound to result in costly workflow disruptions due to software malfunction or data corruption. Apart from the servicing side, other use of the software like training of new or inexperienced users may also result in a disruption of the productive system.

Such complex software may therefore be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

The logical systems are identical in large parts, function autonomously and may be run on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

A transport management system connects the logical systems and serves to forward approved services to the next stage of the system landscape via logical transport paths 105. A service may for example be approved in the development system 101 for export. It will then be forwarded to an input buffer of the quality assurance system 102. Import into the quality assurance system 102 is approved manually by an operator. Once the service has been imported into the quality assurance system 102, it will automatically be forwarded to an import buffer of the training system 103 and the productive systems 104 where it will be imported following manual approval by an operator.

The operator is in charge of manually assuring that no untested service is imported. For that purpose, he needs to manually compare a service identifier with approved service identifiers. This process is time consuming and bears the risk of errors.

The operator is also in charge of manually assuring that services are imported into their target systems only. A project like adaptation of the software to new legislation may require servicing of particular systems of the system landscape only. Presently, all systems simply forward the imported services to all other systems connected thereto. During the project, a considerable number of services may be required over a considerable period of time, and access to systems that are not affected by the project has to be denied manually by the operator for each and every service. This process is time consuming and bears the risk of errors. An automated way presently is to change system changeability parameters of each system on a project basis, e.g. to specify in each system whether it accepts services corresponding to a particular project. This, too, is time consuming and bears the risk of errors and requires authorized access to each system.

The operator is finally in charge of manually assuring that the services are imported in the correct order. The importance of the correct order is illustrated in FIG. 2a and FIG. 2b. An original version 201 of the software and data is first modified by a first service 202, resulting in modified version 203, and subsequently by a second service 204, resulting in modified version 205, cf. FIG. 2a. However, if the second service 204 is imported before the first service 202, the original version 201 is changed into modified version 206 by the second service 204 and subsequently into modified version 207 by the first service 202, cf. FIG. 2b. The modified versions 205 and 207 differ and the version 207 will not perform as intended.

In view of the fact that an SAP R/3 implementation may comprise dozens of systems and require thousands of services per month during phases of change, the operator time required becomes considerable as does the risk for errors to occur.

SUMMARY

In one aspect of the invention, a method is provided for tracking transport requests in a system landscape comprising a central control system and a plurality of logical systems interconnected by logical transport paths, a transport request defining a software service for a system in the landscape, the method including feeding a transport request into a logical system of the plurality of logical systems; providing a data supplier in the logical system for supplying, to the central system, data supplier information containing information about the transport request; providing a data collector in the central system for obtaining the data supplier information and accordingly updating status data; and providing a tracking service in the central system, the tracking service allowing to analyze the status data.

In a further aspect of the invention, a computer system is provided comprising: a central control system; a plurality of logical systems; logical transport paths that interconnect the logical systems to form a software system landscape, the logical transport paths allowing a transport request to be fed into a first system of the plurality of logical systems, a transport request defining a software service for a system in the landscape; a data supplier in the system for supplying, to the central system, data supplier information containing information about the transport request; a data collector in the central control system for obtaining the data supplier information and accordingly updating status data; and a tracking service in the central system, the tracking service allowing to analyze the status data.

In a still further aspect of the invention, a computer program product is provided, the computer program product comprising on a storage medium a computer code that upon execution on a computer system performs the method according to the invention.

BRIEF DESCRIPTION OF THE DRAWINGS

Further embodiments of the invention are inferable from the following description and the claims.

FIG. 1 shows a system landscape of the prior art.

FIGS. 2a and 2b illustrate services performed in different orders according to the prior art.

DETAILED DESCRIPTION

Figure 3:
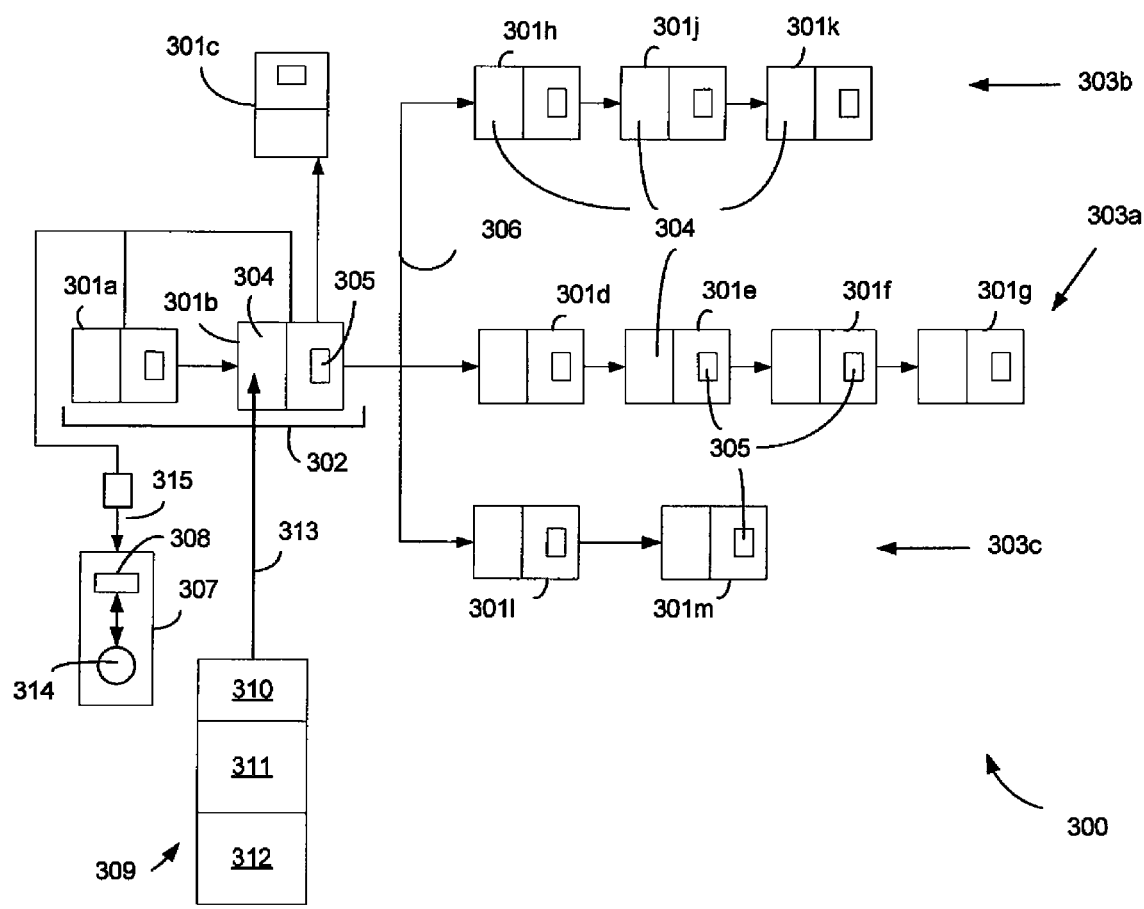
FIG. 3 illustrates a system landscape according to an example embodiment of the invention.

The embodiment shown in FIG. 3 shows an SAP R/3 Release 4.5 system landscape 300 with separate logical systems 301 that are here divided into a global part 302, e.g. at a main development and production facility, and local parts 303a, 303b, 303c, e.g. at other production facilities.

The global part 302 comprising at least a development system 301a for customizing and development work, a quality assurance system 301b for testing functionality using representative test data, and a productive system 301c for actual productive use.

The local part 303a comprises a development system 301d for customizing and development work of local adaptations to SAP, e.g. to meet different legal requirements if part 303a is localized in a different country than the global part 302. The local part 303a further comprises a quality assurance system 301e for testing functionality using representative test data, a training system 301f for training new users, and a productive system 301g for actual productive use.

The local part 303b comprises a development system 301h, a quality assurance system 301j and a productive system 301k, but no training system. The local part 303c is a two system landscape comprising a development system 301l and a productive system 301m only.

The system landscape may be different according to the actual requirements. Fewer or more, different or differently connected or grouped systems 301 may be defined as needed.

The logical systems 301 are identical in large parts and function autonomously. The quality assurance system 301j for example resembles the productive system 301k in that it provides all the functionality, its present data and additionally special test data. New customization settings or adaptations may thus be thoroughly tested in the quality assurance system 301j without jeopardizing the productive system 301k.

Each system 301 comprises an import buffer 304 and a data supplier 305. A transport management system connects the logical systems 301 and serves to effect software services across the system landscape via logical directional transport paths 306. A service may for example relate to customization of a system 301, e.g. a selection of predefined functionality in the system 301, or an adaptation of a system 301, e.g. an addition of or amendment to functionality, or to program and data updates or the like. A system path (not shown) is provided between each system 301 and a central system 307 having a data collector 308.

The systems 301 of each part 302, 303a, 303b, 303c and the central system 307 may be located and simultaneously executed in a single computer, or may be distributed across separate hardware. The global part 302 and the local parts 303a, 303b, 303c each run on physically separate computer systems, which themselves may comprise different computers.

Figure 4:
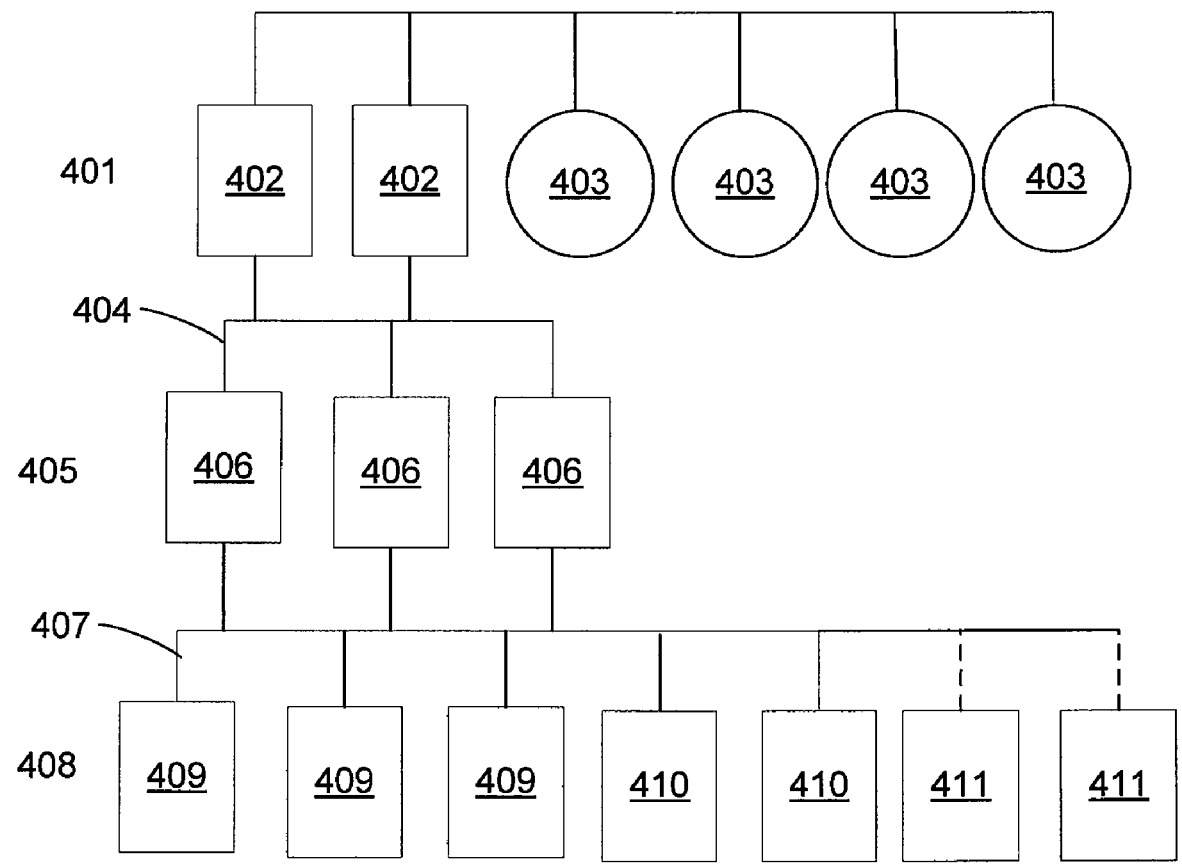
FIG. 4 shows an example embodiment of the hardware of a computer system according to the invention.

An example implementation of the local part 303a may comprise, cf. FIG. 4, a data base layer 401 for storing and retrieving business data like a factory inventory, employee data, sales figures etc. The data base layer 401 comprises one or more data base servers 402 and four data bases 403, one for each of the systems 301d, 301e, 301f and 301g.

Connected to the data base layer 401 by a suitable network 404, e.g. a LAN, is an application layer 405 for execution of the software of the systems 301d, 301e, 301f and 301g. The application layer 405 comprises one or more application servers 406.

Finally, connected to the application layer 405 by a suitable network 407, e.g. a LAN, is a presentation layer 408 for the graphical user interface (GUI). The presentation layer 408 comprises dumb terminals 409, Personal Computers 410 and/or wireless access devices 411 like PDAs.

Figure 5:
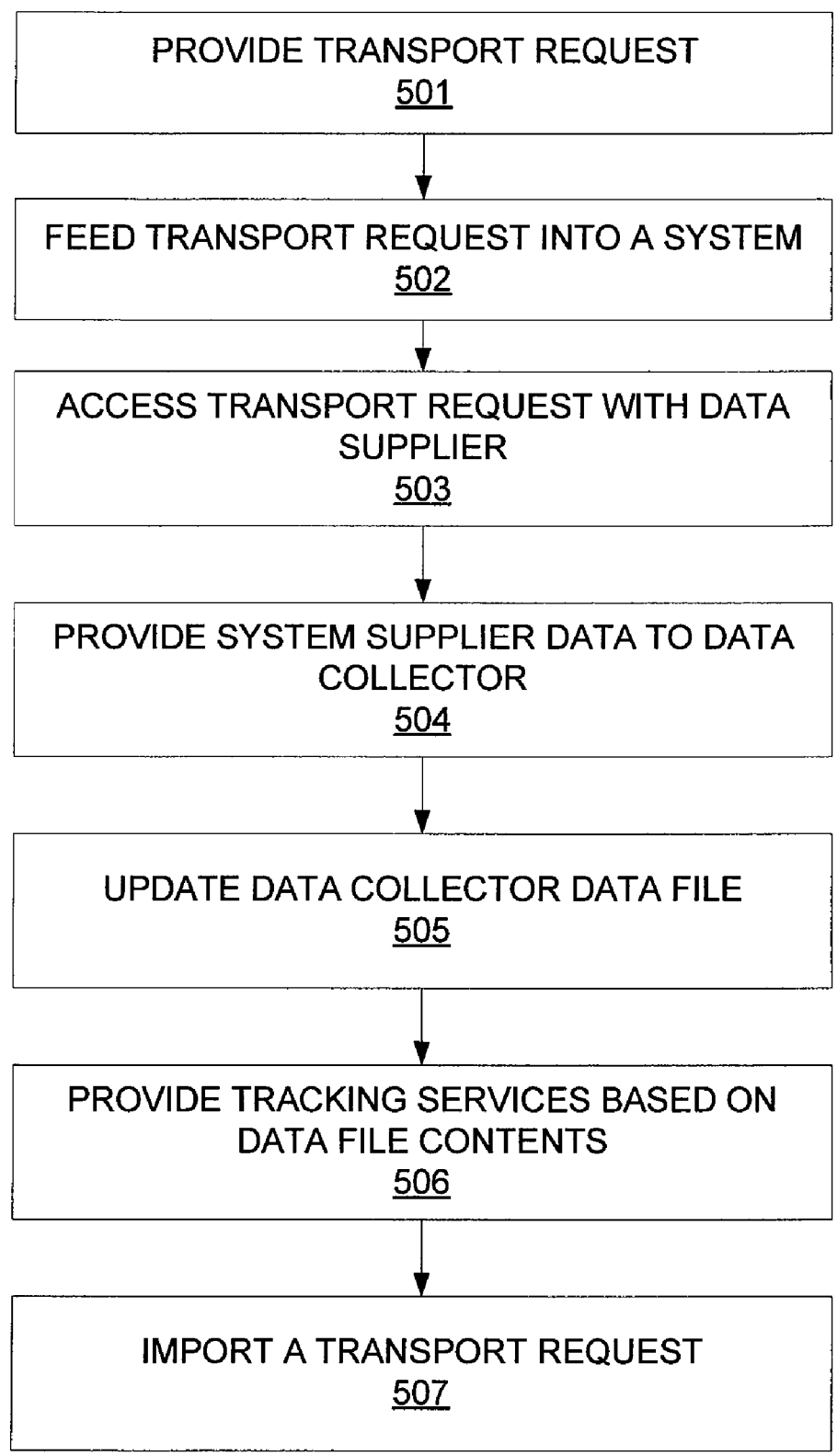
FIG. 5 shows a flow diagram of a method according to an example embodiment of the invention.

The method according to an example embodiment of the invention is now described with reference to FIG. 5 and FIG. 3.

A software service is provided 501 using a transport request 309. The transport request 309 is structured data comprising an identifier 310, e.g. DEVK900251, general information 311 regarding the service, e.g. indicating that the service is a program patch, and service data 312, e.g. a piece of program code for a patch.

The transport request 309 is fed 502 into the import buffer 304 of one of the systems 301, e.g. the quality assurance system 301b of the global part 302. This initial feeding may occur from the development system 301a through a transport path 306, but may also be effected manually as shown by path 313. At operation 503, the data supplier 305 of system 301b detects the transport request 309, accesses at least a part of its data, in particular the identifier 310 and the general information 311, and provides, at operation 504, the accessed data together with further information in a predefined format as system supplier data 315 to the data collector 308. The further information may comprise a system identifier and system status information, e.g. a list of the support packages and services installed on the system 301b, project data, project status indicators etc.

The data collector 308 updates, e.g. generates, deletes or changes, status data in a data file 314 that in this example is located within the central system 307, operation 505. The data file 314 may also be held in a different place or be a data base entry. The status data may contain a copy of the system supplier data 315, or data based on an analysis of the system supplier data 315. Likewise stored in the data file 314 or other data files is system supplier data 315 provided by the data suppliers 305 of the other systems 301.

The data collector 308 maintains an up to date record of the state of all systems 301 of the system landscape 300. For this purpose, the data collector 308 calls each data supplier 305 periodically for an update. Alternatively or additionally, the data suppliers 305 may contact the data collector 308 if relevant data has changed.

The central system 307 provides tracking services based on the data in data file 314, operation 506. These tracking services may comprise a request analysis, a status analysis, a sequence analysis, a project analysis, generation of reports, checking services etc. as explained in detail in the following.

A request analysis allows the search through all transport requests pending in the system landscape 300 according to certain criteria. For example, all transport requests belonging to a particular project, originating from a particular developer, being older than a predeterminable period of time may be determined and provided in a results list using this tracking service.

A status analysis allows the status of certain requests, e.g. the requests of the results list of the request analysis, to be analyzed. The analysis may state in which systems the requests have been approved, when they have been approved, in which systems they are pending to be approved, whether errors or system messages have been recorded during importation into a system etc.

A sequence analysis allows to determine the import sequence of the transport requests into each system, the sequence of transport requests in the import buffers, and the automated centralized assessment whether the sequences are correct.

A project analysis allows to determine the transport requests belonging to a particular project and its state.

Reports may be generated and automatically analyzed. Such analysis may comprise comparing a report with a reference report to check for completeness, comparing the imports of transport requests in two different systems, comparing and analyzing import sequences in order to identify sequence errors, comparison of a request list with the contents of the import buffer of a system, determining the overall status of an object list, e.g. a list of objects belonging to a project, etc.

Based on the tracking service results, and with consideration of further information like project association and project status data, one or more transport requests may be imported automatically, operation 507. A manual approval of the automated import by an operator may be required.

Although the foregoing has been a description of an example embodiment of the invention, it will be apparent to those skilled in the art upon review of this disclosure that numerous variations and modifications may be made in the invention. For example, instead of using SAP R/3 Release 4.5, other SAP and non-SAP systems may benefit from the invention.

What is claimed is:

1. A method for retrieving a status of a logical system in a system landscape comprising a central control system and a plurality of the logical systems interconnected by logical paths, the method including:
   receiving, via a transport request into an import buffer of the logical system, a software service to add to or modify existing functionality of the logical system, the transport request including a software service identifier, information descriptive of a type of the software service, and program code of the software service;
   effecting the program code of the software service within the logical system;
   in a data supplier of the logical system;
   detecting the received transport request,
   accessing data of the transport request including at least the software service identifier and the information descriptive of the type of the software service effected within the logical system,
   collecting, into a predefined format, the accessed data and further information including information about the status of the effected program code of the software service within the logical system, and
   supplying the collected data in the predefined format to a data collector of the central control system;
   receiving, by the data collector of the-central control system, the collected data in the predefined format;
   updating data maintained by the data collector based on the collected data received in the predefined format, the updating including execution of a tracking service in the central control system for tracking the transport request and analyzing the information about the status of the logical system.

2. The method of claim 1, wherein the tracking service provides at least one of group consisting of a request analysis, a status analysis, a sequence analysis, a project analysis, and report generation.

3. The method of claim 1, wherein the transport request is fed into an input buffer of the logical system and imported from the input buffer into the logical system upon approval.

4. The method of claim 1, wherein the central control system approves import of the transport request into the logical system.

5. The method of claim 1, wherein the transport request is imported into the logical system and fed into another logical system connected to the logical system via a logical path of the logical paths.

6. The method of claim 1, wherein the data collector maintains an up-to-date record of state information of the plurality of the logical systems.

7. The method of claim 1, wherein the data collector periodically accesses the data supplier for updated information.

8. The method of claim 1, wherein the data supplier contacts the data collector upon a change to the information about the status.

9. A computer system comprising:
   a central control system;
   a plurality of logical systems;
   logical transport paths that interconnect the logical systems to form a software system landscape, the logical transport paths allowing a transport request to be fed into and program code of a software service included in the transport request effected within a first system of the plurality of logical systems, the transport request defining a software service for the first system, data of the transport request including a software service identifier, information descriptive of a type of the software service, and the program code of the software service;
   a data supplier in the first system to:
   detect the transport request,
   access data of the transport request including at least the software service identifier and the information descriptive of the type of the software service effected within the first system,
   collect, into a predefined format, the accessed data and further information including information about a status of the effected program code of the software service within the logical system, and
   supply, to the central control system, the collected data in the predefined format;

a data collector in the central control system to obtain the collected data from the data supplier in the predefined format and accordingly update status data maintained by the data collector in a data file used for service tracking; and a tracking service in the central control system, the tracking service to analyze the status data.

10. The computer system of claim 9, wherein the tracking service comprises a provider to provide at least one of a group consisting of a request analysis, a status analysis, a sequence analysis, a project analysis, and report generation.

11. The computer system of claim 9, wherein the first system comprises an input buffer to receive the transport request and a receiver to receive an approval to import the transport request from the input buffer into the first system.

12. The computer system of claim 9, wherein the central control system comprises an approver to provide an approval to import the transport request into the first system.

13. The computer system of claim 9, wherein the data collector comprises an up-to-date record of state information of the plurality of the logical systems.

14. The computer system of-claim 9, wherein the data collector is designed to periodically access the data supplier for updated information.

15. The computer system of claim 9, wherein the data supplier is designed to contact the data collector upon change of the information.

16. A machine-readable storage medium having instructions embedded thereon, the instructions executable by one or more processors to perform a method for retrieving a status of a logical system in a system landscape comprising a central control system and a plurality of the logical systems interconnected by logical paths, the method comprising:

receiving, via a transport request into an import buffer of the logical system, a software service to add to or modify existing functionality of the logical system, the transport request including a software service identifier, information descriptive of a type of the software service, and program code of the software service;

effecting the program code of the software service within the logical system;

in a data supplier of the logical system:
detecting the received transport request,
accessing data of the transport request including at least the software service identifier and the information descriptive of the type of the software service effected within the logical system,
collecting, into a predefined format, the accessed data and further information including information about the status of the effected program code of the software service within the logical system, and
supplying the collected data in the predefined format to a data collector of the central control system;

receiving, by the data collector of the central control system, the collected data in the predefined format; and updating data maintained by the data collector based on the collected data received in the predefined format, the updating including execution of a tracking service in the central control system for tracking the transport request and analyzing the information about the status of the logical system.

* * * * *